United States Patent [19]
Dimroth et al.

[11] 3,923,777
[45] Dec. 2, 1975

[54] AZO DYE FROM AN ORTHO-OXYDIAZOLYLANILINE DIAZO COMPONENT

[75] Inventors: Peter Dimroth; Ernst Schaffner, both of Ludwigshafen, Germany

[73] Assignee: Badische-Anilin & Soda-Fabrik Aktiengesellschaft, Ludwigshafen (Rhine), Germany

[22] Filed: July 5, 1973

[21] Appl. No.: 376,565

[30] Foreign Application Priority Data
July 10, 1972 Germany............................ 2233871

[52] U.S. Cl............... 260/157; 106/23; 117/161 K; 260/25; 260/37 NP; 260/38; 260/42.21; 260/42.46
[51] Int. Cl.² ........................................ C09B 29/20
[58] Field of Search ............. 260/152, 157, 156, 155

[56] References Cited
UNITED STATES PATENTS

| | | | |
|---|---|---|---|
| 2,195,011 | 3/1940 | Petitcolas et al. ................... | 260/157 |
| 2,313,738 | 3/1943 | Dickey et al. ...................... | 260/156 |
| 2,872,441 | 2/1959 | Kracker et al. ..................... | 260/157 |
| 2,901,473 | 8/1959 | Steinemann ........................ | 260/157 |
| 3,398,134 | 8/1968 | Ball et al. .......................... | 260/157 |
| 3,473,928 | 10/1969 | Süs....................................... | 260/157 |

FOREIGN PATENTS OR APPLICATIONS

| | | | |
|---|---|---|---|
| 352,427 | 4/1961 | Switzerland........................ | 260/157 |

OTHER PUBLICATIONS

Nippon, "Derwent Japanese Patents Report," Vol. 5, No. 3, pp. 2:7–2:8 (2-11-66).
Nippon, "Derwent Japanese Patents Report," Vol. 5, No. 37, pp 2:8 (10-17-66).

*Primary Examiner*—Henry R. Jiles
*Assistant Examiner*—Robert W. Ramsuer
*Attorney, Agent, or Firm*—Johnston, Keil, Thompson & Shurtleff

[57] ABSTRACT

Azo dyes derived from ortho-oxdiazolylaniline diazo components and from coupling components containing a hydroxy group or an enolizable keto group in ortho- or para-position to the azo bridge. The dyes are yellow to red and are useful as disperse dyes and particularly as pigments. The pigments give fast colorations in printing inks, resins and surface coatings.

5 Claims, No Drawings

AZO DYE FROM AN ORTHO-OXYDIAZOLYLANILINE DIAZO COMPONENT

The invention relates to dyes of the formula (I):

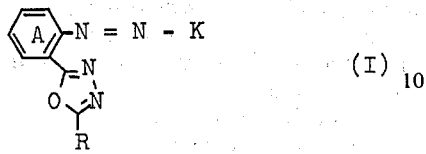

in which

K is the radical of a coupling component which contains a hydroxy group or an enolizable keto group in the ortho-position or the para-position to the azo bridge;

R is an unsubstituted or substituted aliphatic, cycloaliphatic, araliphytic or aromatic radical, and the radical A may bear one or more substituents.

Examples of substituents for the radical A are: bromo, methyl, methoxy, ethoxy, methylsulfonyl, ethylsulfonyl, phenyl, cyano and particularly chloro and nitro.

Examples of radicals R are alkyl of one to eight carbon atoms which may bear hydroxy, alkoxy of one to four carbon atoms, cyano, acyloxy, carbamoyl or N-substituted carbamoyl as a substituent, cyclohexyl, benzyl, phenylethyl, styryl, phenyl, phenyl bearing halogen, alkyl, alkoxy, cyano, nitro, sulfamoyl, N-substituted sulfamoyl, arylsulfonyl or acylamino as a substituent, naphthyl or anthraquinonyl.

Examples of individual radicals R in addition to those already specified are: methyl, butyl, β-ethylhexyl, cyanomethyl, β-hydroxyethyl, β-ethoxyethyl, β-butoxyethyl, acetoxymethyl, carbamoylmethyl, N,N-dimethylcarbamoylmethyl, chlorophenyl, dichlorophenyl, methylphenyl, methoxyphenyl, methoxychlorophenyl, methoxydichlorophenyl, methylchlorophenyl, cyanophenyl, nitrophenyl, nitrochlorophenyl, nitromethoxyphenyl, nitromethylphenyl, sulfamoylphenyl, N-phenylsulfamoylphenyl, N-dichlorophenylsulfamoylphenyl, phenylsulfonylphenyl, acetylaminophenyl, benzoylaminophenyl, dichlorobenzoylaminophenyl or naphthoylaminophenyl.

Compounds of the phenol, naphthol, acetoacetarylide, pyrazolone, quinolone, pyridone, pyrimidone or isoquinolone series are suitable as coupling components.

Examples of individual coupling components are phenol, o-cresol, m-cresol, p-cresol, α-naphthol, β-naphthol, 2-naphthol-3-carboxylic esters, 2-naphthol-3-carboxylic amides, acetoacetanilide, acetoacet-o-anisidide, 1-phenyl-3-methylpyrazolone, 1-phenyl-3-carboxylic ester or amide, 2,4-dihydroxyquinoline, N-methyl-4-hydroxyquinolone-2, 2,6-dihydroxy-3-cyano-4-methylpyridine, 2,6-dihydroxy-3-carbamoyl-4-methylpyridine, N-methyl-2-hydroxy-3-cyano-4-methylpyridone-6, N-γ-methoxypropyl-2-hydroxy-3-cyano-4-methylpyridone-6, N-butyl-2-hydroxy-3-cyano-4-methylpyridone-6, N-benzyl-2-hydroxy-3-cyano-4-methylpyridone-6, 2-amino-4,6-dihydroxypyrimidine, 2,4-dihydroxy-6-aminopyrimidine, 2,4-diamino-6-hydroxypyrimidine, 1,3-dimethyl-4-hydroxypyrimidinedione-2,6 or 1,3-dihydroxyisoquinoline.

Dyes of the formula (I) may be prepared by reacting a diazo compound of an amine of the formula (II):

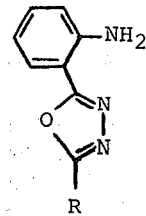

In the production of dyes having 2-naphthol-3-carboxylic acid amide components it is convenient to start from an acid chloride of the formula:

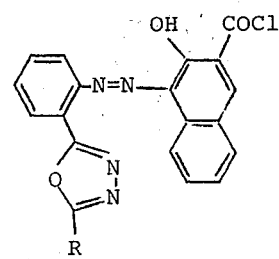

and to convert this into a dye amide by a conventional method by reaction with an appropriate amine.

Dyes suitable as pigments are particularly compounds of the formula (I) in which R is an aromatic radical and K is the radical of a coupling component of the β-naphthol, acetoacetarylide, pyrimidine, dihydroxyquinoline or dihydroxypyridine series. These dyes are distinguished by great insolubility in solvents and as pigments they almost always have good fastness to overlacquering, migration and overspraying as well as very good fastness to light. They may therefore be used in printing inks, surface coatings or plastics such as PVC.

Pigments of formula (I) are not always in the optimal physical form for the special purpose of application. They may be converted into the most suitable form however by conventional methods such as grinding with salt, heating in water or solvents.

Other dyes of the formula (I) and particularly those in which R is an aliphatic radical and the coupling component originates from the cresol, N-alkylpyrimidine, N-alkylpyridine or N-alkylquinoline series are good disperse dyes which are preferably suitable for dyeing polyester fibers and give dyeings having good fastness to light. Dyes of the formula (Ia):

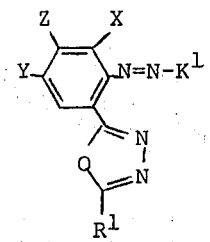

in which

X is hydrogen or chloro;

Y is hydrogen, chloro or nitro;

Z is hydrogen or nitro;

K[1] is the radical of a coupling component of the acetoacetarylide, pyridone, pyrimidone and particularly of the 2-naphthol-3-carboxylic arylamide series; and R[1] is unsubstituted or substituted phenyl or naphthyl are of particular industrial significance.

Coupling components of the pyridone and pyrimidone series do not contain any substituents on the nitrogen atom. More particular dyes of the invention are those of the formula (Ib):

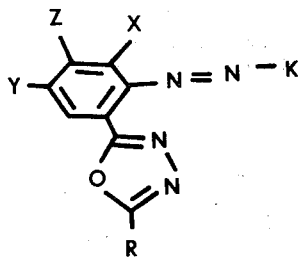

in which

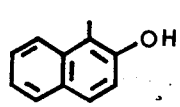 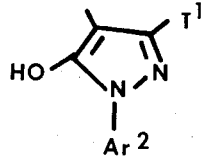

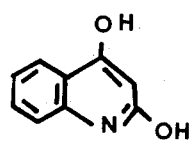 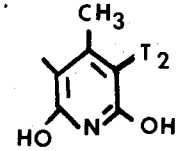

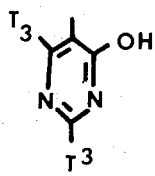 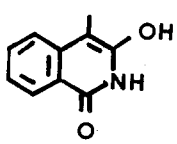

or 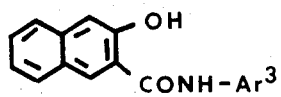

Ar[1] is phenyl or phenyl substituted by chloro, methoxy, ethoxy, methyl,

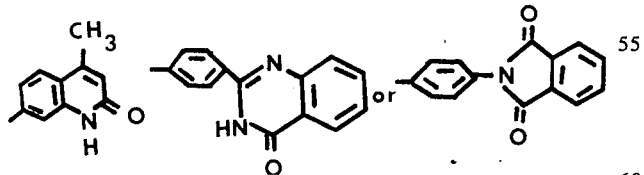

Ar[2] is phenyl or phenyl substituted by chloro methyl,
Ar[3] is phenyl, phenyl substituted by chloro, methoxy, methyl, phenylaminocarbonyl, chlorophenylaminocarbonyl, dichlorophenylamino-carbonyl, phthaloylaminophenylaminocarbonyl, anthraquinonylamino-carbonyl, benzoylaminophenylaminocarbonyl, sulfonylphenylamono-carbonyl, N-(phenylsulfamoyl- or N-chlorophenylsulfamoyl)--phenylamimocarbonyl, phthaloylaminobenzoylamino, chlorobenzoylamino, anthraquinonylcarbonylamino or ethylphenylaminocarbonyl or naphthyl or phenylaminooxalylamino, T[1] is methyl or carbamoyl, T[2] is cyano or carbamoyl, T[3] is $NH_2$ or OH with the proviso that al least one is $NH_2$, R is phenyl, phenyl substituted by chloro, bromo, methyl, methoxy, cyano, nitro, phenyl, sulfamoyl, N-phenylsulfamoyl, phenylsulfonyl, acetylamino, benzoylamino or dichlorobenzoylamino, naphthyl or anthraquinonyl, X is hydrogen or chloro Y is hydrogen, chloro or nitro and Z is hydrogen or nitro.

The following Examples illustrate the invention. Unless otherwise stated references to parts and percentages in the Examples are by weight.

EXAMPLE 1

14.1 parts of 2-(2'-phenyloxidazolyl-1',3'-4')-4-nitroaniline is introduced at 10° to 15°C into 100 parts of 85% sulfuric acid, cooled to 0° to 5°C and diazotized by adding 15 parts of nitrosylsulfuric acid (12.7% of $N_2O_3$). The whole is stirred for another three hours at 5°C. The mixture is then poured onto a mixture of 400 parts of ice and 600 parts of water. 13.2 parts of finely powdered 2-naphthol-3-carboxylic N-phenylamide is added and dilute caustic soda solution is dripped in until a pH of from 6 to 7 has been set up. The whole is stirred for another six hours, suction filtered and washed thoroughly with water. The filter cake is introduced into 200 parts of dimethylformamide, stirred for three hours at 100°C, suction filtered, washed thoroughly with methanol and dried. 24 parts of a red powder is obtained having the formula:

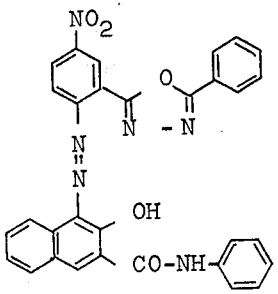

Dyes corresponding to the coupling components given in the following Table and having the hues indicated are obtained analogously to Example 1.

| Example No. | Coupling component | Hue |
|---|---|---|
| 2 | (2-naphthol-3-CONH-phenyl-Cl) | red |

—Continued
| Example No. | Coupling component | Hue |
|---|---|---|
| 3 | 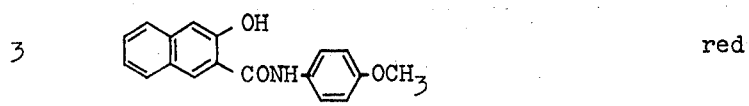 | red |
| 4 | 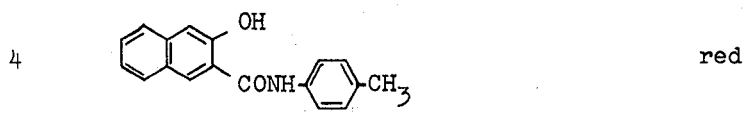 | red |
| 5 |  | orange |
| 6 |  | yellow |
| 7 | 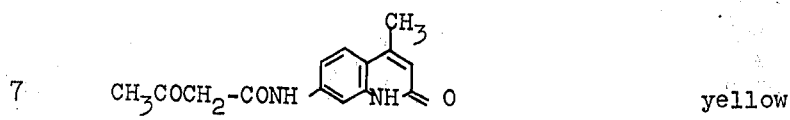 | yellow |
| 8 | 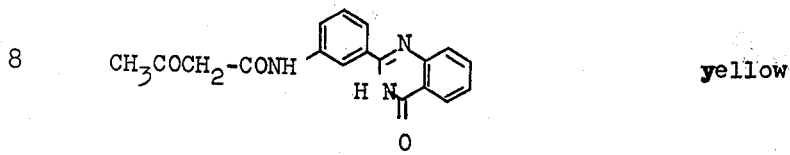 | yellow |
| 9 |  | yellow |
| 10 |  | yellow |
| 11 |  | yellow |
| 12 |  | yellow |

-Continued

| Example No. | Coupling component | Hue |
|---|---|---|
| 13 | 4-amino-2,6-dihydroxypyrimidine (HO-, NH₂, N, N, OH) | yellow |
| 14 | 3-cyano-4-methyl-2,6-dihydroxypyridine (CH₃, CN, HO, N, OH) | yellow |
| 15 | 3-carbamoyl-4-methyl-2,6-dihydroxypyridine (CH₃, CONH₂, HO, N, OH) | yellow |
| 16 | CH₃-COCH₂-CONH-C₆H₄-N(phthalimido) | yellow |
| 17 | CH₃-COCH₂-CONH-C₆H₄-OCH₃ (ortho) | yellow |
| 18 | 3-methyl-5-pyrazolone | yellow |
| 19 | 3-methyl-1-phenyl-5-pyrazolone | yellow |
| 20 | 3-carbamoyl-1-phenyl-5-pyrazolone (H₂N-CO-) | yellow |

—Continued
| Example No. | Coupling Component | Hue |
|---|---|---|
| 21 |  | yellow |
| 22 | 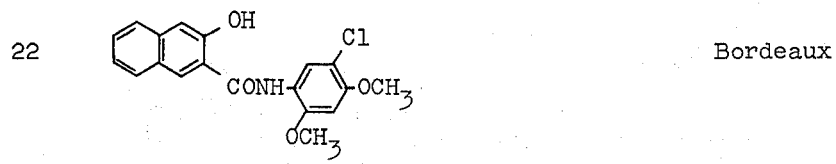 | Bordeaux |
| 23 | 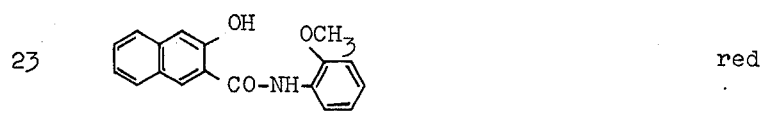 | red |
| 24 | 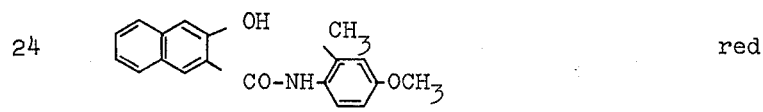 | red |
| 25 | 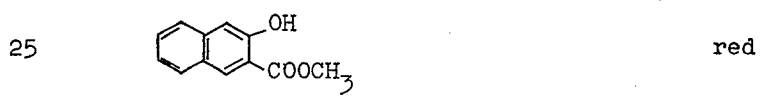 | red |
| 26 | 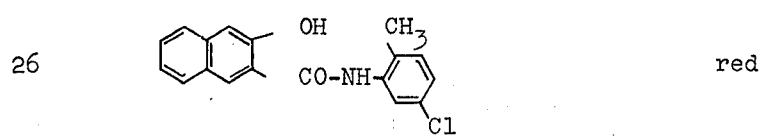 | red |
EXAMPLE 27
The procedure described in Example 1 is followed but 9.4 parts of β-hydroxynaphthoic acid is used as the coupling component. After coupling is over the whole is acidified to pH 1 with dilute sulfuric acid, suction filtered, washed thoroughly with water and dried. 21 parts of the acid:

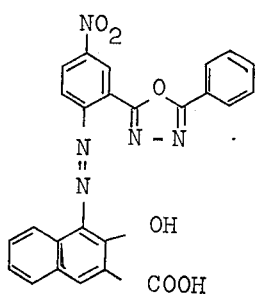

is obtained. 481 parts of this acid is heated in 2200 parts of dry dichlorobenzene, 2 parts of dimethylformamide and 350 parts of thionyl chloride for 1 hour at 100°C, for two hours at 120°C and for 1 hour at 130°C, then cooled, suction filtered when cold, washed with dry benzene and dried. 295 parts of the acid chloride is thus obtained.

25 parts of this acid chloride is added to 250 parts of dry dichlorobenzene, 22 parts of p-aminobenzoanilide is added and the whole is stirred for one hour at 90°C, one hour at 110°C and 2 hours at 120°C. The whole is suction filtered hot, washed with dichlorobenzene and dried. 40 parts of a red powder of the formula:

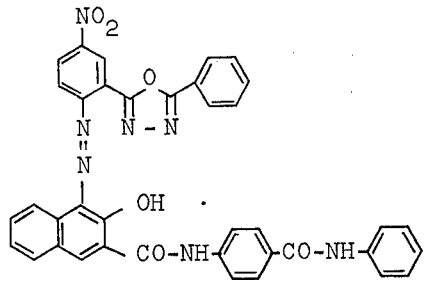

is obtained in this way.

EXAMPLES 28 to 67

The procedure described in Example 27 is followed but the amines specified in the following Table are used instead of p-aminobenzoanilide. The corresponding dyes are obtained and have the hues indicated:

| Example No. | Amine | Hue |
|---|---|---|
| 28 | NH₂—⟨⟩—CO—NH—⟨⟩ (Cl, Cl) | red |
| 29 | NH₂—⟨⟩—CO—NH—⟨⟩ (Cl, Cl) | red |
| 30 | NH₂—⟨⟩—CO—NH—⟨⟩ (Cl) | red |
| 31 | NH₂—⟨⟩—CO—NH—⟨⟩—N(phthalimido) | red |
| 32 | NH₂—⟨⟩—CO—NH—⟨⟩—CH₂(phthalimido) | red |
| 33 | NH₂—⟨⟩—CO—NH—⟨⟩(OCH₃)—N(CO—)(CO—) | Bordeaux |

—Continued
| Example No. | Amine | Hue |
|---|---|---|
| 34 | 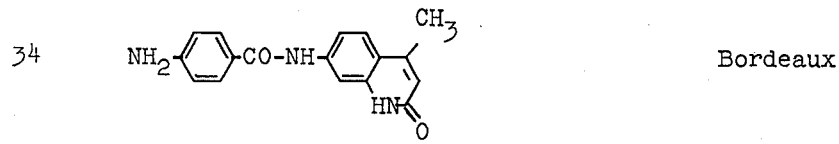 | Bordeaux |
| 35 | 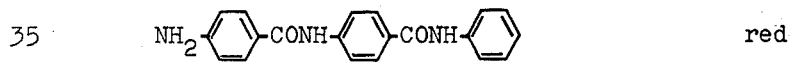 | red |
| 36 | 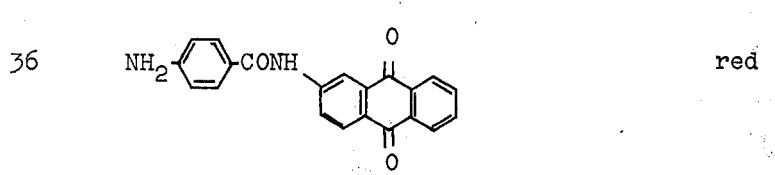 | red |
| 37 | 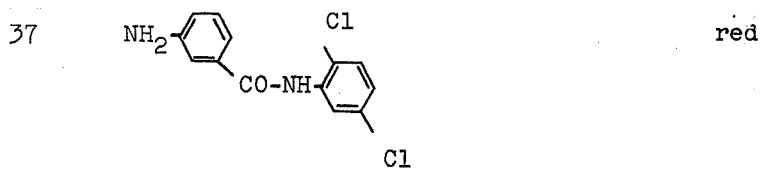 | red |
| 38 | 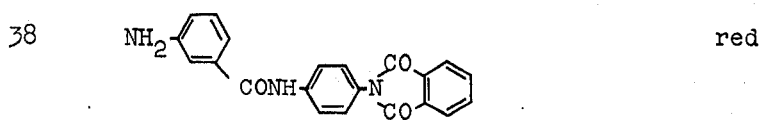 | red |
| 39 | 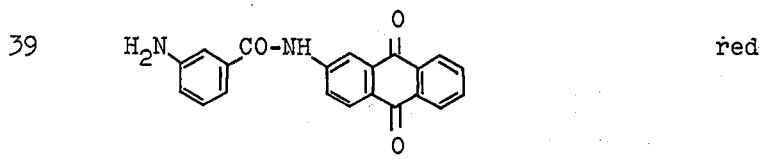 | red |
| 40 | 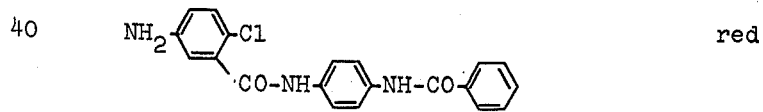 | red |
| 41 | 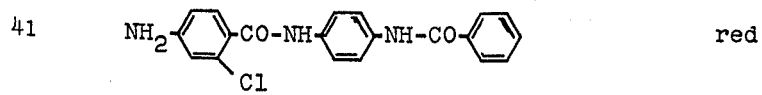 | red |
| 42 | 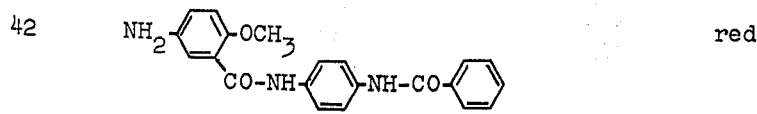 | red |

-Continued
| Example No. | Amine | Hue |
|---|---|---|
| 43 | 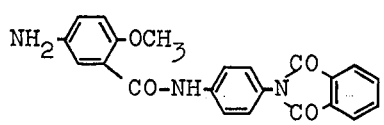 | Bordeaux |
| 44 | 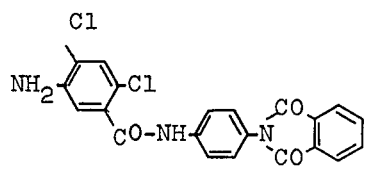 | red |
| 45 | 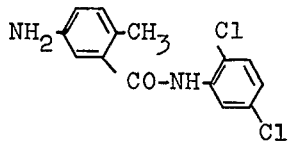 | red |
| 46 | 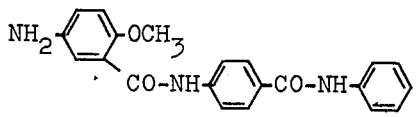 | Bordeaux |
| 47 | 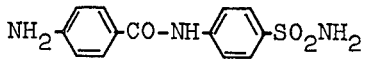 | red |
| 48 | 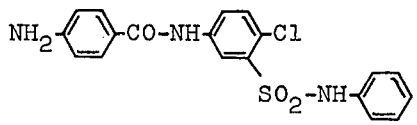 | red |
| 49 | 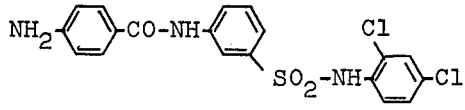 | red |
| 50 | 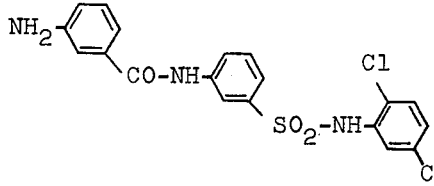 | red |
| 51 | 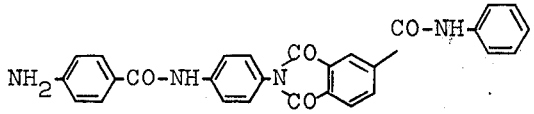 | Bordeaux |

| Example No. | Amine | Hue |
|---|---|---|
| 52 | 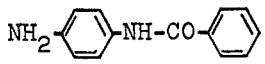 | red |
| 53 | 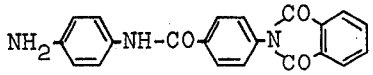 | red |
| 54 | 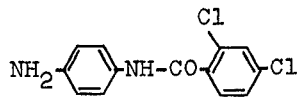 | red |
| 55 | 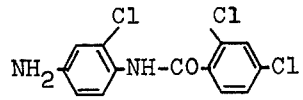 | red |
| 56 | 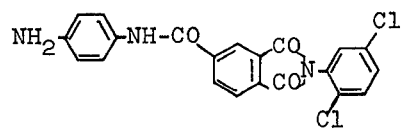 | red |
| 57 | 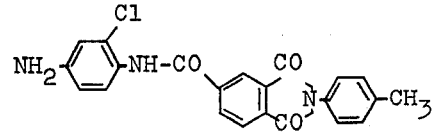 | red |
| 58 | 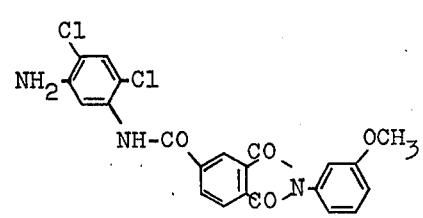 | maroon |
| 59 | 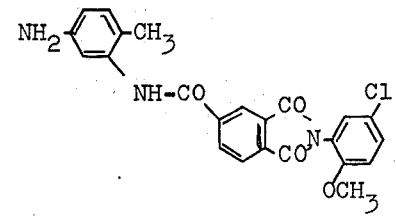 | Bordeaux |
| 60 | 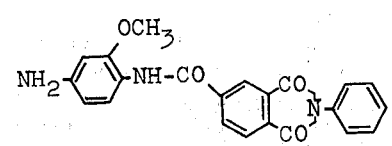 | Bordeaux |
| 61 | 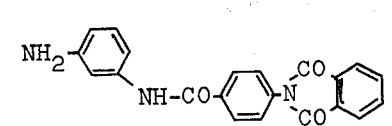 | red |

| Example No. | Amine | Hue |
|---|---|---|
| 62 | 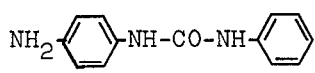 | maroon |
| 63 | 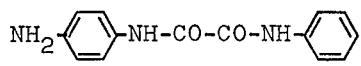 | red |
| 64 | 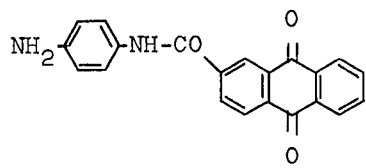 | red |
| 65 | 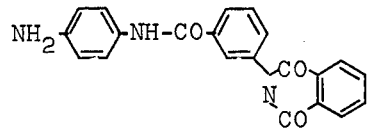 | Bordeaux |
| 66 | 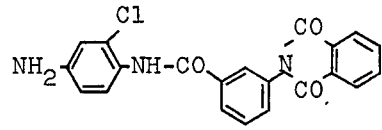 | red |
| 67 | 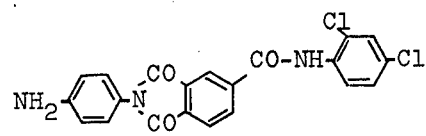 | Bordeaux |

EXAMPLE 68

30.5 parts of 2-(2'-phenyloxdiazolyl-1',3'-4')-4,6-dichloroaniline is introduced at from 10° to 15°C into 200 parts of 85% sulfuric acid, cooled to 0° to 5°C and diazotized at 5° to 10°C by adding 30 parts of nitrosylsulfuric acid (12.7% of $N_2O_3$) and stirring for 4 hours. The diazo solution is poured while stirring into a mixture of 400 parts of ice and 700 parts of water, 26 parts of 2-naphthol-3-carboxylic-N-phenylamide is added and a pH of from 6 to 7 is set up by dripping in dilute caustic soda solution. The whole is stirred for 8 hours, suction filtered, washed thoroughly, the moist filter cake is suspended in 5000 parts of methyl glycol and stirred for two hours at 110°C. After suction filtration, washing with methanol and drying 45 parts of a red powder of the formula:

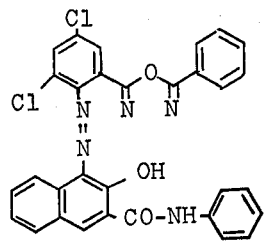

is obtained.

As described in Example 68 dyes having the hue indicated in the following Table are obtained with the diazo components and coupling components given. Dyes referred to as "Disp." under the heading "Hue" are polyester disperse dyes which give the hue mentioned in good fastness properties on polyesters when dyed by a conventional method.

Diazo component for
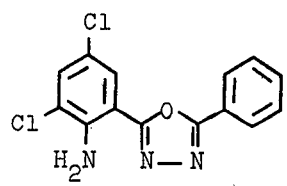
EXAMPLES 69 TO 81
| Ex. No. | Coupling component | Hue |
|---|---|---|
| 69 | 3-hydroxy-2-naphthoyl-amino-phenyl-CO-NH-(2,5-dichlorophenyl) | red |
| 70 | 2-hydroxynaphthalene | orange |
| 71 | 4-methyl-3-cyano-2,6-dihydroxypyridine | yellow |
| 72 | 1,4-dimethyl-3-cyano-6-hydroxy-2-pyridone | yellow Disp. |
| 73 | 4-hydroxy-2-hydroxyquinoline | yellow |
| 74 | 3-methyl-5-pyrazolone | yellow |
| 75 | 1-phenyl-3-methyl-5-pyrazolone | yellow Disp. |
| 76 | 4-hydroxytoluene | " " |

-Continued
| Ex. No. | Coupling component | Hue |
|---|---|---|
| 77 | 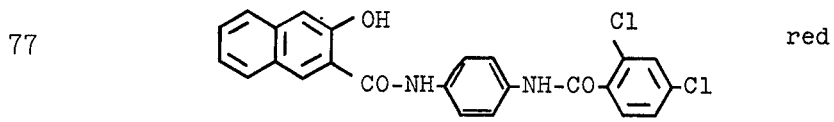 | red |
| 78 | 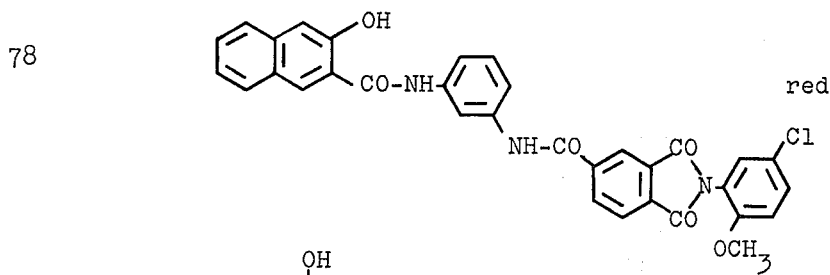 | red |
| 79 |  | yellow Disp. |
| 80 | 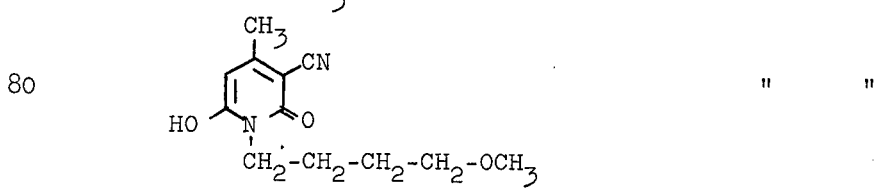 | " " |
| 81 |  | yellow |
Diazo components for Examples 82 to 85
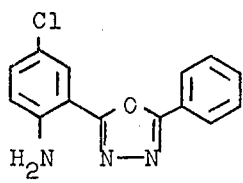
| 82 |  | orange |
| 83 |  | red Disp. |
| 84 | 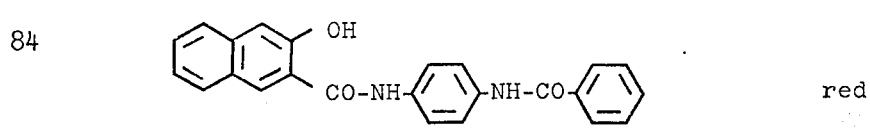 | red |

—Continued

| Ex.No. | Coupling component | Hue |
|---|---|---|
| 85 | 3-hydroxy-naphthalene-2-carboxylic acid anilide with phthalimide substituent | red |
| 86 | 3-hydroxy-naphthalene-2-carboxylic acid anilide-NH-CO- with N-(2,5-dichlorophenyl)phthalimide substituent | red |
| 87 | 3-hydroxy-naphthalene-2-carboxylic acid anilide-NH-CO-phenyl-phthalimide | red |
| 88 | 3-hydroxy-naphthalene-2-carboxylic acid anilide-CO-NH-(2,5-dichlorophenyl) | red |
| 89 | 2,4-dihydroxyquinoline | yellow |
| 90 | 3-methyl-1-phenyl-5-pyrazolone | yellow Disp. |
| 91 | 4-methyl-3-cyano-2,6-dihydroxypyridine | yellow |
| 92 | 1,4-dimethyl-3-cyano-6-hydroxy-2-pyridone | yellow Disp. |
| 93 | 4-hydroxy-1-methyl-2-quinolone | " " |
| 94 | —CH$_3$-COCH$_2$-CO-NH- (4-methyl-3,4-dihydroquinolin-2(1H)-one) | yellow |

—Continued
| Ex. | Diazo component | Coupling component | Hue |
|---|---|---|---|
| 95 | 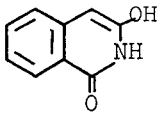 | | yellow |
| Ex. | Diazo component | Coupling component | Hue |
|---|---|---|---|
| 96 | 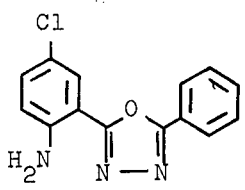 | 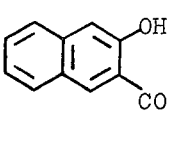 | red |
| 97 | 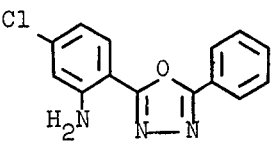 | 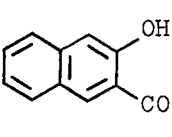 | red |
| 98 | " | " | 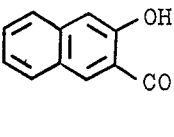 red |
| 99 | " | " | 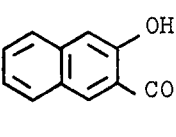 red |
| 100 | 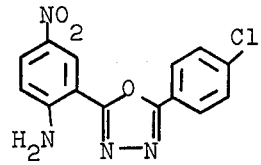 | 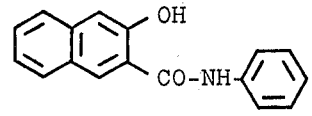 | red |
| Ex. | Diazo component | Coupling component | Hue |
|---|---|---|---|
| 101 | 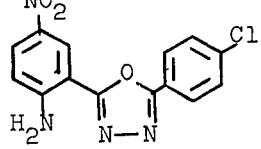 | 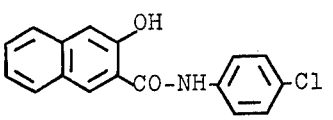 | red |
| 102 | " | " | 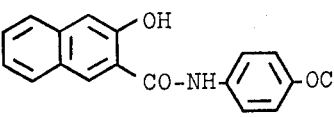 red |
| 103 | " | " | 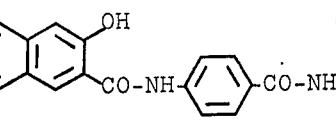 red |

-Continued

| Ex. | Diazo component | Coupling component | Hue |
|---|---|---|---|
| 104 | 2-amino-5-nitrophenyl-(2,5-dichlorophenyl)-1,3,4-oxadiazole | 3-hydroxy-N-phenyl-2-naphthamide | red |
| 105 | " | 3-hydroxy-2-naphthoyl-amino-N-(2,5-dichlorophenyl)benzamide | red |
| 106 | 2-amino-5-nitrophenyl-(4-methoxyphenyl)-1,3,4-oxadiazole | 3-hydroxy-N-phenyl-2-naphthamide | red |
| 107 | " | 3-cyano-4-methyl-2,6-dihydroxypyridine | yellow |
| 108 | " | 2-amino-4,6-dihydroxypyrimidine | yellow |

| Ex. | Diazo component | Coupling component | Hue |
|---|---|---|---|
| 109 | 2-amino-5-nitrophenyl-(2,5-dichloro-4-hydroxyphenyl)-1,3,4-oxadiazole | 3-hydroxy-2-naphthoylamino-phenyl-phthalimide | dull red |
| 110 | " | 3-hydroxy-2-naphthoylamino-(2-methoxyphenyl)-phthalimide | " |
| 111 | 2-amino-5-nitrophenyl-[4-(phenylcarbonylamino)phenyl]-1,3,4-oxadiazole | 3-hydroxy-N-phenyl-2-naphthamide | red |
| 112 | 2-amino-4-nitrophenyl-(phenyl)-1,3,4-oxadiazole | 3-hydroxy-N-phenyl-2-naphthamide | red |

-Continued

| Ex. | Diazo component | Coupling component | Hue |
|---|---|---|---|
| 113 | 2-amino-5-nitrophenyl-(5-methyl-1,3,4-oxadiazol-2-yl) | 2-naphthol | orange Disp. |
| 114 | " | 1-methyl-4-hydroxy-2-quinolone | yellow Disp. |
| 115 | 2-amino-5-nitrophenyl-(5-methyl-1,3,4-oxadiazol-2-yl) | 1-methyl-3-cyano-4-methyl-2-hydroxy-6-oxopyridine | yellow Disp. |
| 116 | 2-amino-5-nitrophenyl-(5-benzyl-1,3,4-oxadiazol-2-yl) | 1-methyl-3-cyano-4-methyl-2-hydroxy-6-oxopyridine | yellow Disp. |
| 117 | 2-amino-5-nitrophenyl-(5-phenoxymethyl-1,3,4-oxadiazol-2-yl) | 1-methyl-3-cyano-4-methyl-2-hydroxy-6-oxopyridine | " " |
| 118 | 2-amino-5-nitrophenyl-[5-(3-chloro-4,6-dimethoxyphenyl)-1,3,4-oxadiazol-2-yl] | 3-hydroxy-N-(3-chloro-4,6-dimethoxyphenyl)-2-naphthamide | dull red |
| 119 | 2-amino-5-nitrophenyl-[5-(4-benzamidophenyl)-1,3,4-oxadiazol-2-yl] | 3-hydroxy-N-phenyl-2-naphthamide | red |
| 120 | 2-amino-4-nitrophenyl-(5-phenyl-1,3,4-oxadiazol-2-yl) | 3-hydroxy-N-(4-methoxyphenyl)-2-naphthamide | red |

-Continued

| Ex. | Diazo component | Coupling component | Hue |
|---|---|---|---|
| 121 | 4-nitro-2-amino-phenyl-5-phenyl-1,3,4-oxadiazole | 3-hydroxy-2-naphthoic acid (4'-(2",5"-dichlorophenylcarbamoyl)anilide) | red |
| 122 | 4-nitro-6-chloro-2-amino-phenyl-5-phenyl-1,3,4-oxadiazole | 3-hydroxy-2-naphthanilide | red |
| 123 | 4-nitro-2-amino-phenyl-5-(4'-nitrophenyl)-1,3,4-oxadiazole | 3-hydroxy-2-naphthanilide | red |
| 124 | " | 3-hydroxy-2-naphthoic acid (4'-(2"-ethylphenylcarbamoyl)anilide) | red |
| 125 | " | " | 2-amino-4,6-dihydroxypyrimidine | yellow |
| 126 | 4-nitro-2-amino-phenyl-5-(3'-chloro-4'-methoxyphenyl)-1,3,4-oxadiazole | 2-hydroxybenzoic acid (4'-(2"-chlorophenylcarbamoyl)anilide) | red |
| 127 | 4-nitro-2-amino-phenyl-5-(3',5'-dichloro-2'-methoxyphenyl)-1,3,4-oxadiazole | 3-hydroxy-2-naphthoic acid (4'-(2",5"-dichlorophenylcarbamoyl)anilide) | red |
| 128 | " | " | 3-hydroxy-2-naphthanilide | red |
| 129 | " | " | 3-hydroxy-2-naphthoic acid (4'-methoxyanilide) | Bordeaux |

—Continued

| Ex. | Diazo component | Coupling component | Hue |
|---|---|---|---|
| 130 | 2-amino-5-nitrophenyl-1,3,4-oxadiazole with phenyl-SO₂NH-phenyl substituent | 3-hydroxy-N-phenyl-2-naphthamide | red |
| 131 | " | 3-hydroxy-N-(4-methoxyphenyl)-2-naphthamide | Bordeaux |
| 132 | 2-(2-amino-4-nitrophenyl)-5-phenyl-1,3,4-oxadiazole | 3-hydroxy-N-(2-naphthyl)-2-naphthamide | red |
| 133 | 2-(2-amino-4-nitrophenyl)-5-phenyl-1,3,4-oxadiazole | 3-hydroxy-N-(4-chlorophenyl)-2-naphthamide | red |
| 134 | 2-(2-amino-4-nitrophenyl)-5-phenyl-1,3,4-oxadiazole | 3-methyl-1-(2,5-dichlorophenyl)-5-pyrazolone | yellow |
| 135 | 2-(2-amino-4-nitrophenyl)-5-(1-naphthyl)-1,3,4-oxadiazole | 3-hydroxy-N-phenyl-2-naphthamide | red |
| 136 | " | 3-hydroxy-N-(2-methylphenyl)-2-naphthamide | red |
| 137 | 2-(2-amino-4-nitrophenyl)-5-(4-biphenylyl)-1,3,4-oxadiazole | 3-hydroxy-N-(2,5-dimethoxyphenyl)-2-naphthamide | Bordeaux |
| 138 | " | 3-hydroxy-N-(2-methoxyphenyl)-2-naphthamide | orange |

| Ex. | Diazo component | Coupling component | Hue |
|---|---|---|---|
| 139 | " | " (3-hydroxy-2-naphthoyl 2-methyl-4-methoxyanilide) | red |
| 140 | 2-(2-aminophenyl)-5-phenyl-1,3,4-oxadiazole | 3-hydroxy-2-naphthoyl anilide | red |
| 141 | " | 3-hydroxy-2-naphthoyl 4-chloroanilide | red |
| 142 | " | 3-hydroxy-2-naphthoyl 4-methoxyanilide | red |
| 143 | " | 3-hydroxy-2-naphthoyl 2-methoxy-4-chloro-5-methoxyanilide | Bordeaux |

EXAMPLES OF APPLICATION

1: in surface coating 10 parts of the dye obtained according to Example 1 and 95 parts of baking finish mixture (for example 70% of coconut alkyd resin, 60% in xylene and 30% of melamine resin, about 55% in butanol/xylene) are ground in an attrition mill. The product is applied and baked for thirty minutes at 120°C. Bright red full shade surface coatings are obtained having very good light fastness and fastness to overspraying. Bright white shades are obtained by adding titanium dioxide.

When pigments (other than disperse dyes marked "Disp.") in the other Examples are used, similar surface coatings are obtained in the hues given.

2: in plastics

Bright polystyrene coloration having excellent fastness to light may be obtained by incorporating 0.5 part of the dye obtained according to Example 1 into 100 parts of polystyrene at 190° to 200°C in an extruder.

Colorations having good hiding power are obtained analogously when 1 part of titanium dioxide is incorporated as well.

Analogous results are obtained by using pigment dyes from the other Examples except those marked "Disp.".

3: in printing ink 8 parts of the pigment obtained according to Example 1, 30 to 40 parts of resin (for example rosin modified with phenol-formaldehyde) and 55 to 65 parts of toluene are intimately mixed in a dispersing machine. A red toluene intaglio printing ink is thus obtained having outstanding light fastness, weather fastness and brightness.

Analogous results are obtained when the pigments from the other Examples, except those marked "Disp." are used.

We claim:

1. An azo dye of the formula

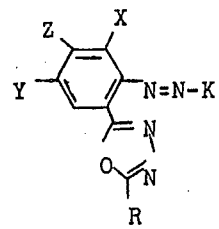

in which K is

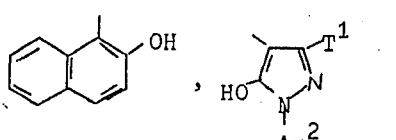

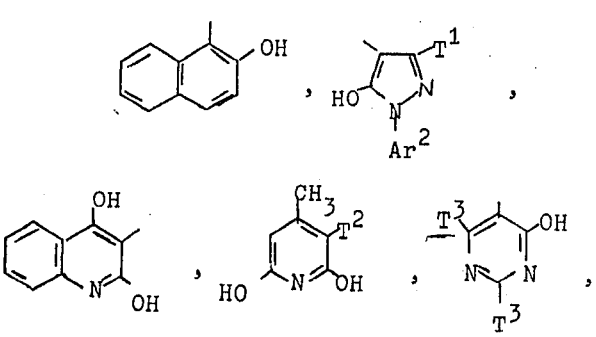

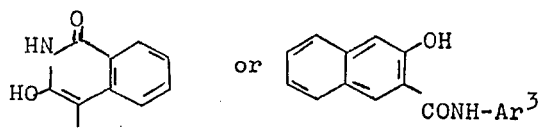

Ar¹ is phenyl or phenyl substituted by chloro, methoxy, ethoxy, methyl,

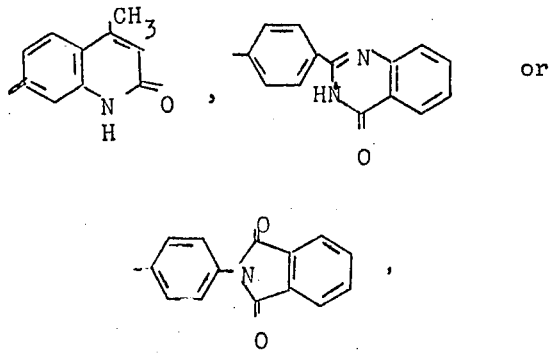

Ar² is phenyl or phenyl substituted by chloro or methyl,
Ar³ is phenyl, phenyl substituted by chloro, methoxy, methyl, phenylaminocarbonyl, chlorophenylaminocarbonyl, dichlorophenylaminocarbonyl, phthaloylaminophenylamino-carbonyl, anthraquinonylaminocarbonyl, benzoylaminophenylaminocarbonyl, sulfonylphenylaminocarbonyl, N-(phenylsulfamoyl- or N-chlorophenylsulfamoyl)-phenylaminocarbonyl, phthaloylaminobenzoylamino, chlorobenzoylamino, phenylaminooxalylamino, anthraquinonylcarbonylamino or ethylphenylaminocarbonyl or naphthyl,
$T^1$ is methyl or carbamoyl,
$T^2$ is cyano or carbamoyl,
R is phenyl, phenyl substituted by chloro, bromo, methyl, methoxy, cyano, nitro, phenyl, sulfamoyl, N-phenylsulfamoyl, phenylsulfonyl, acetylamino, benzoylamino or dichlorobenzoylamino, naphthyl or anthraquinonyl,
X is hydrogen or chloro
Y is hydrogen, chloro or nitro and
Z is hydrogen or nitro.

2. A dye of the formula according to claim 1, wherein K is

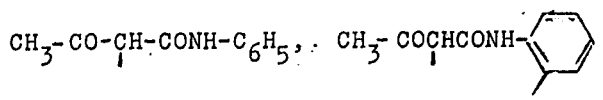

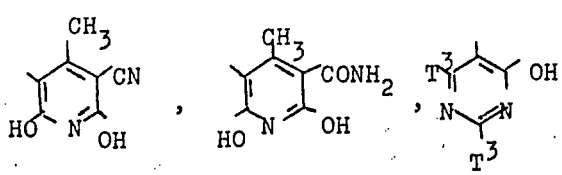

and
Ar³, R, T³, X, Y and Z have the meanings given for claim 1.

3. A dye of the formula according to claim 1, wherein K is

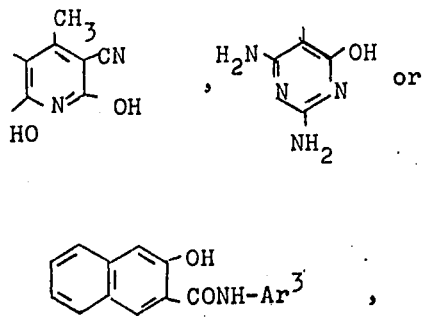

R is phenyl, phenyl substituted by chloro, methyl, methoxy, benzoylamino or dichlorobenzoylamino or naphthyl and X, Y, Z and Ar³ have the meanings given for claim 1.

4. A dye of the formula according to claim 1, wherein K is

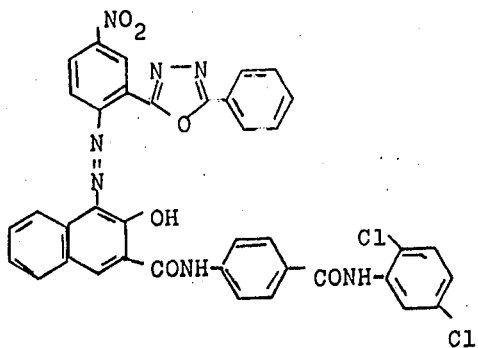

Ar⁴ is phenyl, phenyl substituted by chloro, methyl, methoxy or dichlorophenylaminocarbonyl or naphthyl and
R, X, Y and Z have the meanings given for claim 3.

5. The dye according to claim 1 of the formula

* * * * *

UNITED STATES PATENT AND TRADEMARK OFFICE
CERTIFICATE OF CORRECTION

PATENT NO. : 3,923,777
DATED : December 2, 1975
INVENTOR(S) : DIMROTH et al

It is certified that error appears in the above-identified patent and that said Letters Patent are hereby corrected as shown below:

In Column 2, after the first formula (formula II)
insert -- with a coupling component of the formula HK --

In Column 3, line 23, after "in which" insert -- K is
$CH_3$-CO-CH-CONH-$Ar^1$

In Column 3, Line 61, delete " ... by chloro methyl, "
and substitute -- ... by chloro or methyl, --

In Column 38, Line 59, after "in which K is" insert
-- $CH_3$-CO+CH-CONH-$Ar^1$ --

Signed and Sealed this

Thirtieth Day of November 1976

[SEAL]

Attest:

RUTH C. MASON
*Attesting Officer*

C. MARSHALL DANN
*Commissioner of Patents and Trademarks*